(12) United States Patent
Moe

(10) Patent No.: US 6,463,608 B1
(45) Date of Patent: Oct. 15, 2002

(54) MULTIPURPOSE PILLOW WITH HAND WARMING MUFF

(75) Inventor: Peggy Michelle Moe, Raytown, MO (US)

(73) Assignee: Kisses From Heaven, Independence, MO (US)

( * ) Notice: Subject to any disclaimer, the term of this patent is extended or adjusted under 35 U.S.C. 154(b) by 0 days.

(21) Appl. No.: 09/683,855

(22) Filed: Feb. 22, 2002

(51) Int. Cl.[7] .............................................. A47C 16/00
(52) U.S. Cl. ........................ 5/646; 5/647; 5/652; 5/656
(58) Field of Search ................................ 2/66, 91, 208; 5/636, 639, 640, 645, 646, 647, 652, 656

(56) References Cited

U.S. PATENT DOCUMENTS

| | | | |
|---|---|---|---|
| 726,164 A | | 4/1903 | Hogan et al. |
| 1,986,697 A | | 1/1935 | Wilson |
| 3,840,916 A | | 10/1974 | Jennings |
| D255,966 S | | 7/1980 | Stadel |
| 4,345,347 A | * | 8/1982 | Kantor ........................... 5/490 |
| 4,893,357 A | * | 1/1990 | Evans ............................ 2/208 |
| 4,949,887 A | * | 8/1990 | Holmes ....................... 126/204 |
| 5,092,005 A | | 3/1992 | Byrn |
| 5,154,649 A | | 10/1992 | Pender |
| 5,261,134 A | | 11/1993 | Matthews |
| 5,499,401 A | * | 3/1996 | Heinmiller ...................... 2/208 |
| 5,519,906 A | | 5/1996 | Fanto-Chan |
| 5,581,833 A | | 12/1996 | Zenoff |
| 5,661,861 A | | 9/1997 | Matthews |
| 6,038,720 A | | 3/2000 | Matthews et al. |

* cited by examiner

Primary Examiner—Michael F. Trettel
(74) Attorney, Agent, or Firm—Hovey Williams LLP

(57) ABSTRACT

An arm-supporting and hand-warming multipurpose pillow system having a pocket defined between an outer surface of the main pillow body and an inner surface of a panel covering at least a portion of the main pillow body.

38 Claims, 2 Drawing Sheets

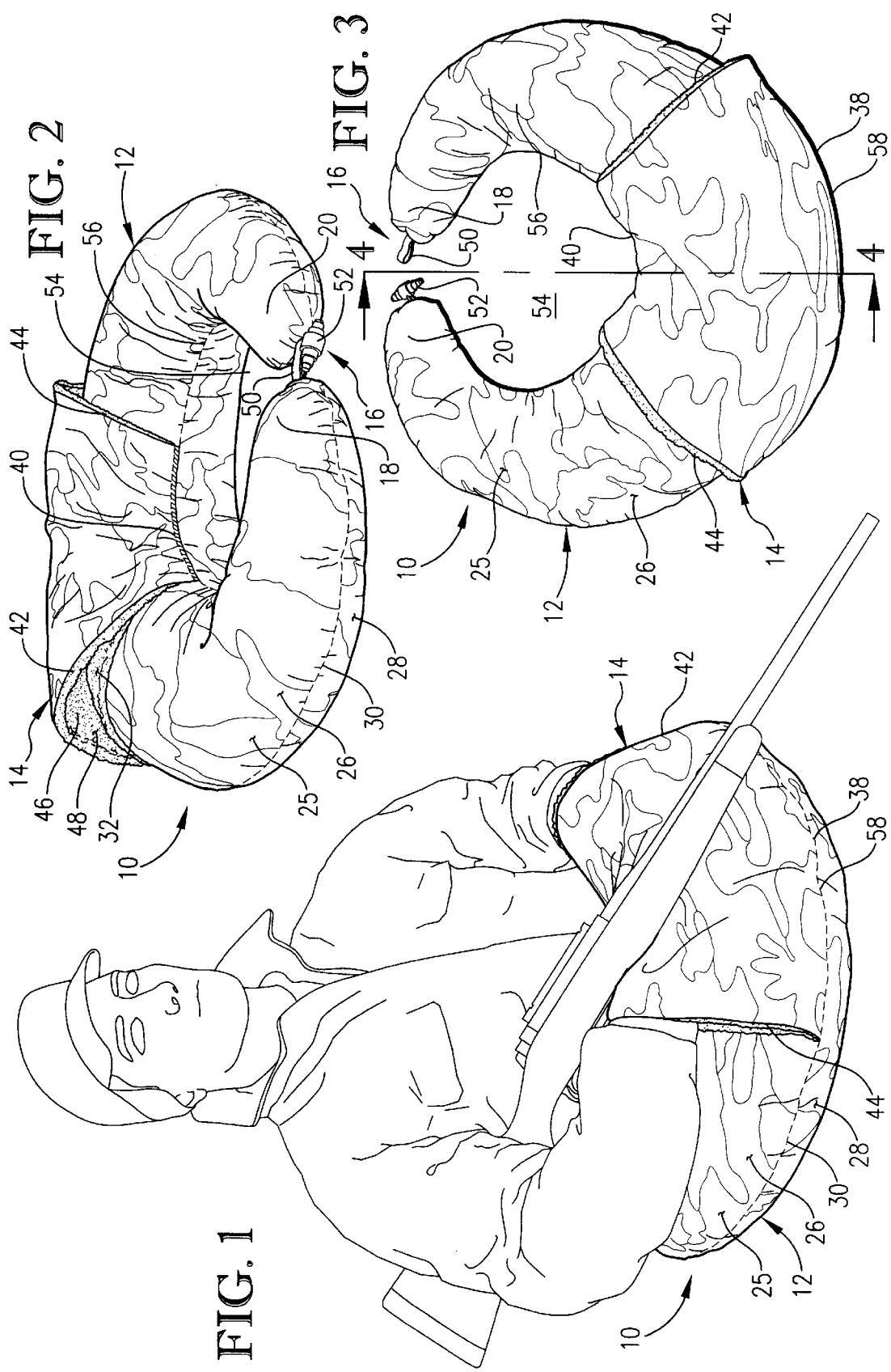

MULTIPURPOSE PILLOW WITH HAND WARMING MUFF

BACKGROUND OF THE INVENTION

1. Field of the Invention

The present invention relates generally to multipurpose body pillows. In a further aspect, the invention concerns a generally C-shaped pillow which can be wrapped around a human torso and used to keep the hands of the human warm while supporting the arms of the human.

2. Description of the Prior Art

Many adults or adolescents participate in activities which make it desirable to support certain objects or body parts. For example, with activities such as reading, typing, breast feeding, and alike, it is often desired to support the arms or elbows. A variety of conventional C-shaped multipurpose pillows are available for performing the supporting functions described above. However, in certain instances, it is desirable not only to support the arms of the human donning the pillow, but also to keep the hands of the human warm. This is especially true in outdoor activities such as hunting.

Certain types of hunting activities (e.g., deer hunting and turkey hunting) may require the hunter to remain virtually motionless for long periods of time. During these motionless periods of time, the hunter must remain in a position which allows him or her to rapidly transition into a firing position with minimal movement. Therefore, it is desirable to support the hunter's arms, and perhaps even the hunter's weapon, in a resting position which minimizes body fatigue and keeps the hunter's arms and weapon close to the firing position. One disadvantage of hunting in cold weather is that gloves must be worn on the hunter's hands. Typically, these gloves are too cumbersome to remain on the hunter's hands when firing the weapon. Thus, the hunter must take extra time and make extra movements to remove the gloves when transitioning from the resting position to the firing position. This extra time and motion of removing the gloves may startle the animal and/or allow it to escape.

SUMMARY OF THE INVENTION

It is therefore an object of the present invention to provide a multipurpose support pillow which can simultaneously support the arms of a human while keeping the hands of the human warm.

Other objects and advantages of the present invention will be apparent from the following detailed description of the preferred embodiment, claims, and drawing figures.

Accordingly, in one embodiment of the present invention, there is provided a hand-warming pillow comprising a generally C-shaped main pillow body and a panel coupled to the main pillow body. The main pillow body presents an outer surface. A pocket portion of the outer surface is covered by the panel. The panel and pocket portion define a hand-warming pocket therebetween. The hand-warming pocket is sized to receive human hands therein.

In another embodiment of the present invention, there is provided a handwarming pillow comprising a generally C-shaped main pillow body, a fastener, a panel, and a hand-warming pocket. The main pillow body has first and second terminal body ends. The main pillow body presents an outer body surface including a normally upper portion and a normally lower portion. The fastener is operable to releasably couple the terminal body ends to one another. The panel presents wide and narrow opposite panel ends and a pair of tapered opposite panel sides. The panel ends are coupled to the main body pillow and the panel sides are detached from the main body pillow. The panel covers a pocket portion of the upper half of the outer body surface. The hand-warming pocket is defined between the panel and the pocket portion of the outer body surface.

In a further embodiment of the present invention, there is provided a method of supporting a pair of human arms and warming a corresponding pair of human hands. The method comprises the steps of: (a) wrapping a generally C-shaped pillow around the torso of a human; (b) resting the pair of human arms on the pillow; and (c) inserting the pair of human hands into a hand-warming pocket of the pillow.

BRIEF DESCRIPTION OF THE DRAWINGS

A preferred embodiment of the present invention is described in detail below with reference to the attached drawing figures, wherein:

FIG. 1 is an isometric view of a multipurpose pillow constructed in accordance with the principles of the present invention, particularly illustrating the manner in which the pillow can be used to support the arms of a human while keeping the human's hands warm;

FIG. 2 is an isometric view of the multipurpose pillow, particularly illustrating the terminal ends of the pillow body being coupled together by a fastener;

FIG. 3 is a top view of the multipurpose pillow illustrated in FIG. 2, particularly illustrating the terminal ends of the pillow body in a decoupled position.

DETAILED DESCRIPTION

Figure 4:
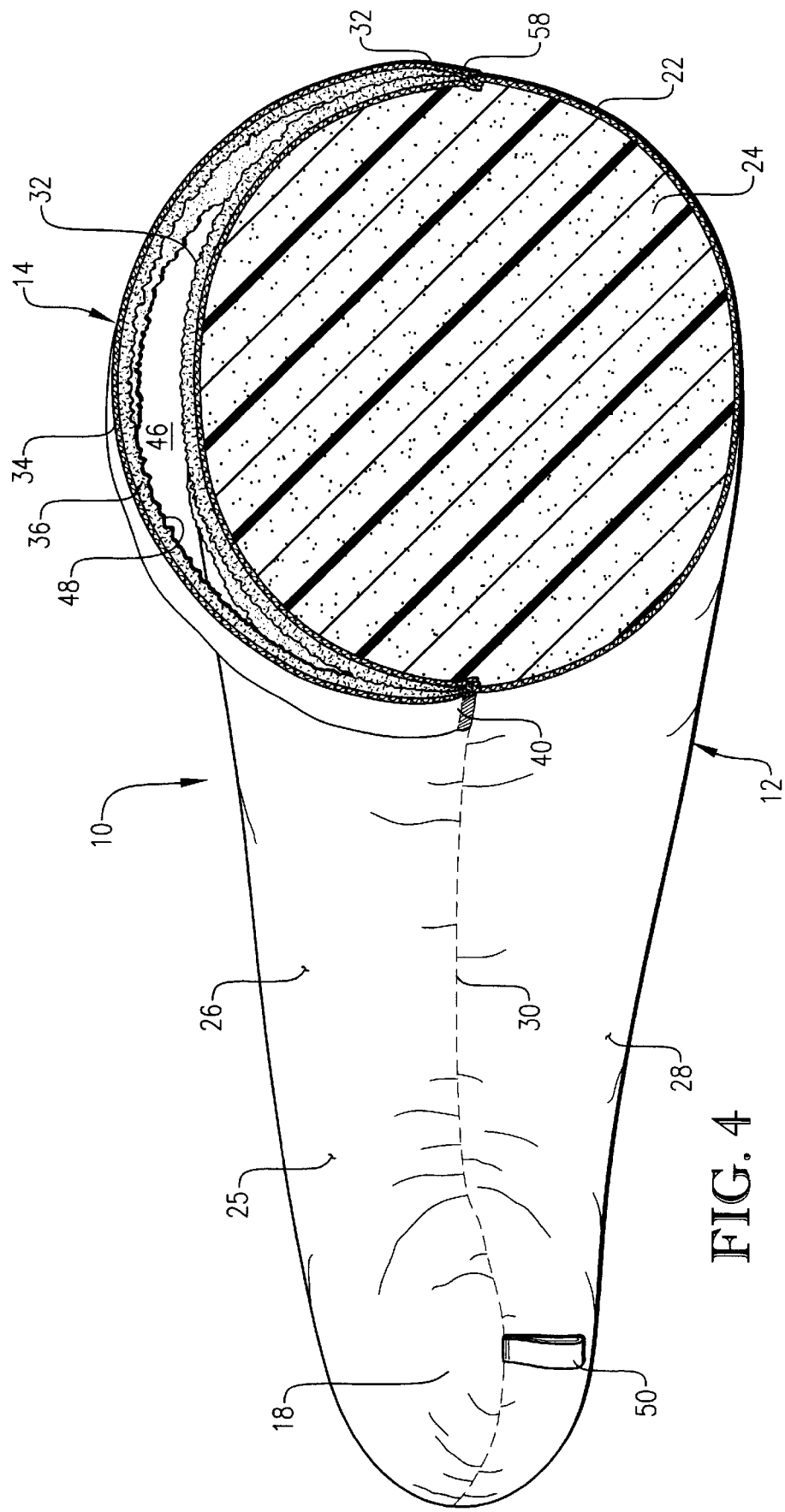
FIG. 4 is a side sectional view of the multipurpose pillow taken along line 4—4 in FIG. 3, particularly illustrating the construction of the main pillow body, the panel, and the hand-warming pocket defined between the outer surface of the main pillow body and the inner surface of the panel.

Referring initially to FIGS. 2 and 3, a multipurpose pillow 10 is illustrated as generally comprising a main pillow body 12, a panel 14, and a fastener 16.

Referring now to FIGS. 1–4, main pillow body 12 has a generally C-shaped configuration and presents first and second terminal body ends 18, 20. Main pillow body 12 has a thick center portion located proximate panel 14 and tapers narrower toward first and second terminal body ends 18, 20. As perhaps best shown in FIG. 4, main pillow body 12 comprises an outer shell 22 filled with a cushioning material 24. Preferably, outer shell 22 is formed of a durable, flexible fabric such as, for example, cotton, polyester, or another pliant conforming fabric. When the intended use for pillow 10 is hunting, outer shell 22 can have a camouflage pattern. Preferably, cushioning material 24 is a highly resilient, lightweight filler material such as, for example, foam rubber. Main pillow body 12 presents an outer body surface 25 which is divided into a normally upper portion 26 and a normally lower portion 28 by a seam 30 which couples the upper and lower halves of outer shell 22 to one another. Main pillow body 12 can be constructed in accordance with the support pillow described in U.S. Pat. No. 5,519,906 granted to Michelle M. Fanto-Chan on May 28, 1996 (assigned of record to the assignee of the present invention), the entire disclosure of which is incorporated herein by reference.

Referring again to FIGS. 2 and 4, panel 14 is coupled to main pillow body 12 and covers a pocket portion 32 of outer body surface 25. Panel 14 preferably comprises a flexible outer layer 34 and a plush inner layer 36. Outer layer is preferably formed of the same type of durable fabric employed for outer shell 22 of main pillow body 12. Plush inner layer 36 is preferably a soft, insulating material such as, for example, wool, animal fur, or a synthetic animal fur.

Referring to FIGS. 2–4, panel 14 preferably has a generally trapezoidal shape and presents a wide panel end 38, a narrow panel end 40, and a pair of tapered panel sides 42, 44 which converge toward one another between the wide and narrow panel ends 38, 40. Panel ends 38, 40 are coupled to main pillow body 12 on generally opposite sides of main pillow body 12 proximate seam 30. Panel sides 42, 44 are at least substantially detached from main pillow body 12. Panel 14 and pocket portion 32 of outer body surface 25 cooperate to define a hand-warming pocket 46 therebetween. Pocket 46 is sized to receive a pair of human hands. Pocket 46 preferably includes two spaced-apart open ends each positioned proximate a respective detached panel side 42, 44. Thus, as perhaps best shown in FIG. 1, each human hand can be inserted into and removed from pocket 46 through its own respective opening.

Referring to FIGS. 2–4, in order to properly receive a pair of human hands, pocket 46 must have the proper shape and size. Because pocket 46 is defined by panel 14 and outer body surface 25, the shape and size of pocket 46 is substantially controlled by the relative shape and size of panel 14 and outer body surface 25. In order to provide pocket 46 with a suitable length, the mean (i.e., average) distance between panel sides 42 and 44 (measured substantially parallel to the direction of extension of ends 38, 40) is in the range of from about 6 inches to about 30 inches, more preferably in the range of from about 10 inches to about 24 inches, and most preferably in the range of from 12 to 18 inches. Accordingly, wide panel end 38 preferably has a length in the range of from about 8 inches to about 36 inches, more preferably in the range of from about 14 inches to about 32 inches, and most preferably in the range of from 20 to 28 inches. Narrow panel end 40 preferably has a length in the range of from about 2 to about 24 inches, more preferably in the range of from 4 to 16 inches. In order to provide pocket 46 with a suitable width, the mean (i.e., average) distance between wide panel end 38 and narrow panel end 40 (measured substantially perpendicular to the direction of extension of ends 38, 40) is in the range of from about 4 inches to about 30 inches, more preferably in the range of from about 6 inches to about 24 inches, and most preferably in the range of from 8 inches to 16 inches. Accordingly, tapered panel sides 42 and 44 each have a length in the range of from about 4 inches to about 24 inches, more preferably in the range of from about 6 inches to about 18 inches, and most preferably in the range of from 8 to 16 inches. All of the above measurements defining the shape and size of panel 14 describe panel 14 in a substantially flat position, not necessarily in the curved configuration illustrated in the drawing figures when panel 14 is coupled to main pillow body 12.

In order to provide pocket 46 with a suitably sized gap between panel 14 and outer body surface 25, it is preferred for an inner panel surface 48 of panel 14 to have a greater surface area than the surface area of pocket portion 32 of outer body surface 25. When the surface area of inner panel surface 48 is greater than the surface area of pocket portion 32, a gap is created therebetween, with the gap defining at least a portion of hand-warming pocket 46. Preferably, the surface area of inner panel surface 48 is in the range of from about 5 percent to about 50 percent greater than the surface area of pocket portion 32, more preferably the surface area of inner panel surface 48 is in the range of from about 10 percent to about 40 percent greater than the surface area of pocket portion 32, and most preferably the surface area of inner panel surface 48 is in the range of from 15 percent to 30 percent greater than the surface area of pocket portion 32. Another way to ensure that pocket 46 is appropriately sized relative to main pillow body 12 is to ensure that panel 14 covers an appropriate portion of normally upper portion 26 of outer body surface 25. Preferably, panel portion 14 covers in the range of from about 20 percent to about 80 percent of normally upper portion 26 of outer body surface 25, more preferably panel 14 covers in the range of from 30 percent to 60 percent of normally upper portion 26 of outer body surface 25. Panel 14 preferably covers substantially none of normally lower portion 28 of outer body surface 25.

Referring now to FIGS. 2 and 3, fastener 16 generally comprises a loop member 50 coupled to first terminal body end 18 and a button member 52 coupled to second terminal body end 20. When fastener 16 is in a decoupled position (shown in FIG. 3), terminal body ends 18, 20 can be shifted away from one another so that pillow 10 can be wrapped around the torso of a human. Once wrapped around the torso of a human, fastener 16 can be shifted into a coupled position (shown in FIG. 2) to thereby releasably couple terminal body ends 18, 20 to one another and secure pillow 10 around the human torso. When fastener 16 is in the coupled position, a torso opening 54 (best shown in FIG. 3) is defined by and extends through main pillow body 12. Torso opening 54 is preferably sized to receive the torso of a human. To ensure that a human torso can be adequately received in torso opening 54 when fastener 16 is in the coupled position, an outer perimeter 56 of torso opening 54 is preferably in the range of from about 24 inches to about 60 inches, more preferably in the range of from about 28 inches to about 48 inches, and most preferably in the range of from 32 inches to 40 inches. Narrow panel end 40 is coupled to main pillow body 12 proximate outer perimeter 56 of torso opening 54, while wide panel end 38 is coupled to an opposite side of main pillow body 12 proximate an outer perimeter 58 of main pillow body 12.

Referring to FIGS. 1–4, in operation, pillow 10 can be used to support a pair of human arms and warm a corresponding pair of human hands by wrapping main pillow body 12 around a human torso and then coupling terminal body ends 18 and 20 to one another by inserting button member 52 through loop member 50 of fastener 16. Once pillow 10 is secured around the torso of the human, the human's arms can be rested on normally upper portion 26 of outer body surface 25 of main pillow body 12. Prior to, or during, the resting of the human arms on main pillow body 12, corresponding human hands can be inserted into hand-warming pocket 46. Because hand-warming pocket 46 extends continuously between its open ends proximate panel sides 42 and 44, once the human hands are received in hand-warming pocket 46, the human hands can directly contact one another to thereby further facilitate warming of the hands.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states her intent to rely on the Doctrine of Equivalents to determine and assess the reasonably fair scope of the present invention as pertains to any apparatus not materially departing from but outside the literal scope of the invention as set forth in the following claims.

What is claimed is:

1. A hand-warming pillow comprising:
    a generally C-shaped main pillow body presenting an outer body surface; and
    a panel coupled to the main pillow body and presenting an inner panel surface covering a pocket portion of the outer body surface,
    the surface area of the inner panel surface being in the range of from about 5 percent to about 50 percent greater than the surface area of the pocket portion, thereby creating a gap between the inner panel surface and the pocket portion.

2. A hand-warming pillow according to claim 1,
    said main pillow body defining an inner torso opening,
    said inner torso opening being sized to receive a torso of a human so that the main pillow body at least substantially surrounds the torso when the pillow is donned by the human.

3. A hand-warming pillow according to claim 1; and
    a fastener coupled to the main pillow body,
    said main pillow body including a pair of terminal body ends normally positioned proximate one another,
    said fastener being coupled to the terminal body ends and operable to releasably couple the terminal body ends to one another.

4. A hand-warming pillow according to claim 1,
    said main pillow body comprising a pliant conforming outer shell and a lightweight filler disposed in the outer shell.

5. A hand-warming pillow according to claim 4,
    said filler being foam rubber.

6. A hand-warming pillow comprising:
    a generally C-shaped main pillow body presenting an outer body surface; and
    a panel coupled to the main pillow body and covering a pocket portion of the outer body surface,
    said panel and said pocket portion defining a hand-warming pocket therebetween,
    said hand-warming pocket being sized to receive human hands therein,
    said panel including a pair of opposite panel ends and a pair of opposite panel sides,
    said panel ends being coupled to the main pillow body,
    said panel sides being detached from the main pillow body.

7. A hand-warming pillow according to claim 6,
    said hand-warming pocket presenting a pair of spaced-apart hand-insertion openings positioned proximate the panel sides.

8. A hand-warming pillow according to claim 6,
    said panel having a mean length measured between the panel sides in the range of from about 6 inches to about 30 inches.

9. A hand-warming pillow according to claim 8,
    said panel having a mean width measured between the panel ends in the range of from about 4 inches to about 30 inches.

10. A hand-warming pillow according to claim 9,
    said panel having a mean length in the range of from about 10 inches to about 24 inches.

11. A hand-warming pillow according to claim 10,
    said panel having a mean width in the range of from about 6 inches to about 24 inches.

12. A hand-warming pillow according to claim 11,
    said panel having a generally trapezoidal shape.

13. A hand-warming pillow according to claim 8,
    said main pillow body comprising a pliant conforming outer shell and a lightweight filler disposed in the outer shell.

14. A hand-warming pillow according to claim 13,
    said filler being foam rubber.

15. A hand-warming pillow comprising:
    a generally C-shaped main pillow body presenting an outer body surface; and
    a panel coupled to the main pillow body and covering a pocket portion of the outer body surface,
    said panel and said pocket portion defining a hand-warming pocket therebetween,
    said hand-warming pocket being sized to receive human hands therein,
    said panel being insulated with a plush material.

16. A hand-warming pillow according to claim 15,
    said hand-warming pocket being lined with the plush material.

17. A hand-warming pillow according to claim 15,
    said main pillow body comprising a pliant conforming outer shell and a lightweight filler disposed in the outer shell.

18. A hand-warming pillow according to claim 17,
    said filler being foam rubber.

19. A hand-warming pillow comprising:
    a generally C-shaped main pillow body having first and second terminal body ends, said main pillow body presenting an outer body surface including a normally upper portion and a normally lower portion;
    a fastener for releasably coupling the terminal body ends to one another;
    a generally trapezoidally shaped panel presenting wide and narrow opposite panel ends and a pair of tapered opposite panel sides, said panel ends being coupled to the main pillow body, said panel sides being detached from the main pillow body, said panel covering a pocket portion of the upper portion of the outer body surface; and
    a hand-warming pocket defined between the panel and the pocket portion of the outer body surface.

20. A hand-warming pillow according to claim 19,
    said fastener including a loop coupled to the first terminal body end and a button coupled to the second terminal body end,
    said button being insertable through said loop to thereby releasably couple the terminal body ends to one another.

21. A hand-warming pillow according to claim 19,
    said main pillow body defining a torso opening extending therethrough when the fastener couples the terminal body ends to one another,
    said torso opening having a torso opening perimeter in the range of from about 24 to about 60 inches.

22. A hand-warming pillow according to claim 21,
    said torso opening having a torso opening perimeter in the range of from about 28 to about 48 inches.

23. A hand-warming pillow according to claim 21,
    said wide panel end being coupled to the body proximate an outer body perimeter,
    said narrow panel end being coupled to the body proximate the torso perimeter.

24. A hand-warming pillow according to claim 19, said panel presenting an inner panel surface which faces the pocket portion of the outer body surface, said inner panel surface having an inner panel surface area, said pocket portion having an outer pocket portion surface area, said inner pocket surface area being in the range of from about 5 percent to about 50 percent greater than the outer pocket portion surface area, thereby providing a gap between the inner panel surface and the pocket portion of the outer body surface, said gap forming at least a portion of the hand-warming pocket.

25. A hand-warming pillow according to claim 24, said inner pocket surface area being in the range of from about 10 percent to about 40 percent greater than the outer pocket surface area.

26. A hand-warming pillow according to claim 19, said panel covering in the range of from about 20 percent to about 80 percent of the upper portion of the outer body surface.

27. A hand-warming pillow according to claim 26, said panel covering substantially none of the lower portion of the outer body surface.

28. A hand-warming pillow according to claim 19, said wide panel end having a length in the range of from about 8 inches to about 36 inches, said narrow panel end having a length in the range of from about 2 inches to about 24 inches, each of said tapered sides having a length in the range of from about 4 inches to about 24 inches.

29. A hand-warming pillow according to claim 19, said hand-warming pocket being lined with a plush insulating material.

30. A hand-warming pillow according to claim 19, said main pillow body comprising a pliant conforming outer shell and a lightweight filler disposed in the outer shell.

31. A hand-warming pillow according to claim 30, said filler being foam rubber.

32. A method of supporting a pair of human arms and warming a corresponding pair of human hands, said method comprising the steps of:

(a) wrapping a generally C-shaped pillow around a torso of a human;

(b) resting the pair of human arms on the pillow; and (c) inserting the pair of human hands into a hand-warming pocket of the pillow.

33. A method according to claim 32, step (c) including passing one of said human hands through a first pocket opening and passing another of said human hands through a second pocket opening spaced from the first pocket opening.

34. A method according to claim 23; and (d) subsequent to step (c), directly contacting said one of said human hands and said another of said human hands with one another in the hand-warming pocket.

35. A method according to claim 32; and (e) subsequent to step (a), coupling the pillow to the human by coupling terminal body ends of the body pillow to one another.

36. A method according to claim 32, said hand-warming pocket being at least partially lined with a plush insulating material.

37. A method according to claim 32, said pillow comprising a pliant conforming outer shell and a lightweight filler disposed in the outer shell.

38. A method according to claim 37, said filler being foam rubber.

* * * * *

UNITED STATES PATENT AND TRADEMARK OFFICE
CERTIFICATE OF CORRECTION

PATENT NO.    : 6,463,608 B1                                                Page 1 of 1
DATED         : October 15, 2002
INVENTOR(S)   : Moe, Peggy Michelle It is certified that error appears in the above-identified patent and that said Letters Patent is hereby corrected as shown below:

<u>Title page,</u>
Item [73], "Assignee: Kisses From Heaven, Independence, MO (US)" should read --
Assignee: Kisses From Heaven, Inc., Independence, MO (US) --.

Signed and Sealed this

Twenty-fifth Day of February, 2003

JAMES E. ROGAN
*Director of the United States Patent and Trademark Office*